United States Patent
Borran et al.

(10) Patent No.: US 7,173,973 B2
(45) Date of Patent: Feb. 6, 2007

(54) MULTIPLE-ANTENNA PARTIALLY COHERENT CONSTELLATIONS FOR MULTI-CARRIER SYSTEMS

(75) Inventors: Mohammad Jaber Borran, Irving, TX (US); Prabodh Varshney, Coppell, TX (US); Jorma Lilleberg, Oulu (FI)

(73) Assignee: Nokia Corporation, Espoo (FI)

( * ) Notice: Subject to any disclaimer, the term of this patent is extended or adjusted under 35 U.S.C. 154(b) by 273 days.

(21) Appl. No.: 10/699,386

(22) Filed: Oct. 31, 2003

(65) Prior Publication Data

US 2005/0094740 A1   May 5, 2005

(51) Int. Cl.
H04K 1/10 (2006.01)
H04L 27/28 (2006.01)

(52) U.S. Cl. ............... 375/260; 375/261; 375/136; 375/147; 375/298

(58) Field of Classification Search ........ 375/260–261, 375/142–145, 147–153, 136, 298, 320
See application file for complete search history.

(56) References Cited

U.S. PATENT DOCUMENTS

| | | | | |
|---|---|---|---|---|
| 4,891,823 A | | 1/1990 | Cole | 375/242 |
| 5,267,021 A | | 11/1993 | Ramchandran et al. | 348/469 |
| 5,537,430 A | | 7/1996 | Park et al. | 714/792 |
| 5,608,763 A | * | 3/1997 | Chiasson et al. | 375/332 |
| 5,822,371 A | * | 10/1998 | Goldstein et al. | 375/242 |
| 5,828,695 A | | 10/1998 | Webb | 375/219 |
| 6,081,555 A | * | 6/2000 | Olafsson | 375/242 |
| 6,097,764 A | | 8/2000 | McCallister et al. | 375/298 |
| 6,654,431 B1 | * | 11/2003 | Barton et al. | 375/346 |
| 2001/0031019 A1 | | 10/2001 | Jafarkhani et al. | 375/267 |
| 2002/0131515 A1 | | 9/2002 | Rodriguez | 375/262 |
| 2003/0076889 A1 | * | 4/2003 | Walker et al. | 375/261 |
| 2003/0123877 A1 | | 7/2003 | Lo | 398/34 |
| 2003/0126536 A1 | | 7/2003 | Gollamudi et al. | 714/748 |
| 2003/0210824 A1 | | 11/2003 | Falzon et al. | 382/240 |
| 2005/0094740 A1 | | 5/2005 | Borran et al. | 375/267 |

FOREIGN PATENT DOCUMENTS

EP     1324558 A1 *  7/2003

OTHER PUBLICATIONS

Albert M. Chan and Inkyu Lee, "A New Reduced-Complexity Sphere Decoder for Multiple Antenna Systems", IEEE, 2002, pp. 460-464.

* cited by examiner

Primary Examiner—Jay K. Patel
Assistant Examiner—Curtis B. Odom
(74) Attorney, Agent, or Firm—Harrington & Smith, LLP

(57) ABSTRACT

A multi-level space time signal constellation that is optimized for use with a multi-carrier, multi-path communication scheme includes points on a first level separated from points on a mutually exclusive second level by a minimum distance that is based on a conditional probability distribution, preferably a Kullback-Leibler (KL) distance. Points within one level may be separated by a Euclidean distance, but spherical levels are rotated relative to one another to maximize a minimum inter-level KL distance. A receiver uses pilot symbols to estimate the channels and two-stage symbol detection, determining in one stage the constellation level and in another stage the point in the level. The receiver calculates a likelihood function based on a conditional distribution which does not reduce to the Euclidean-based nearest-neighbor detector. A single stored constellation may be scaled based on received signal to noise ratio. Each constellation defines n=2M real dimensions, wherein M is the number of transmit antennas.

3 Claims, 8 Drawing Sheets

MIMO OFDM MODEM

MIMO MC-CDMA MODEM

MULTIPLE-ANTENNA PARTIALLY COHERENT CONSTELLATIONS FOR MULTI-CARRIER SYSTEMS

FIELD OF THE INVENTION

The present invention relates to signal constellations designed for partially-coherent digital communications, where the receiver is not assumed to have perfect knowledge of channel state. The present invention describes signal constellations whose points are not disposed by strictly Euclidean geometry, and is particularly adapted for communications systems employing multiple channels and/or multiple transmit antennas.

BACKGROUND

In wireless communication systems, channel state information (CSI) at the receiver is obtained through transmission of a number of known pilot or training symbols, and using an estimation algorithm at the receiver to estimate the unknown channel based on the knowledge of the transmitted symbols. The estimation variance depends on the noise variance, number of the channel components to be estimated, and number of the pilot or training symbols (number of independent measurements). However, in general, the more the number of channel measurements, the lower the estimation variance will be. For a slowly fading channel where the fading coefficients remain approximately constant for many symbol intervals, the transmitter can send a large number of training or pilot symbols per channel realization without a significant loss in the data rate, and allow the receiver to accurately estimate the fading coefficients. In this case, one can safely use a perfect CSI assumption to design optimal codes and constellations.

In fast fading channels, however, this approach (sending a large number of training or pilot symbols) is either infeasible (due to the fast variations of the channel), or results in a significant loss in the actual data rate (due to the fraction of the time spent on training). Because of the increased number of channel parameters, this problem becomes even more acute in MISO (multiple input, single output) and MIMO (multiple input, multiple output) systems. As a result, in high mobility environments, the number of measurements per channel realization is relatively small and the estimation quality is affected by one or both of the following effects:

The number of measurements per channel component is very small, resulting in a larger estimation variance due to the additive noise, Some of the channel components are not estimated at all (e.g., the paths with small energy in a multipath environment). These components appear as additive terms in the estimation variance, which do not vanish at high SNR and result in an error floor in the performance curves.

In the presence of channel estimation errors due to the above effects, the code and constellations that are designed for the case of perfect CSI are no longer optimal.

Prior art approaches typically assume that the receiver has perfect channel state information, and the conventional constellations and multiple-antenna techniques (such as transmit diversity or BLAST™ scheme), which are designed for perfect CSI at the receiver were used. As a result, either very poor performance was achieved due to the estimation errors (especially in fast fading environments), or a large fraction of the system resources had to be used for training, resulting in a substantial reduction in the achievable rates.

What is needed in the art is a signal constellation specifically designed with the assumption of imperfect channel state information at the receiver that remains robust with fast-fading channels. Such as signal constellation would be particularly advantageous in a multi-path communication system, especially a system wherein the transmitter employs more than one transmit antenna (such as a MIMO OFDM or a MC-CDMA system). At least in such fast fading environments, such a signal constellation should offer performance improvement over conventional signal constellations that were designed with the assumption of perfect channels state information at the receiver, without increasing bandwidth or reducing data rates.

SUMMARY OF THE INVENTION

In accordance with the present invention, a multi-level space-time signal constellation embodied in or on an electronic, optical, and/or electro-optical storage media is presented. The levels include a first level defining at least one point and a second level defining a plurality of points. A distance between a point defined by the second level and a nearest point defined by the first level is a maximized minimum distance between conditional distributions. The signal constellation defines C points and an average power that is greater than or equal to a sum of the squares of the absolute value of each point divided by the number C. Preferably, the levels are concentric spheres to reduce detection complexity at the receiver, which may scale a stored signal constellation based on a signal to noise ratio of a received signal. Signal constellations are optimized for multi-carrier and multi-path communications techniques. Where a transmission is from M>1 antennas simultaneously, the optimized signal constellation defines n=2M real dimensions. The receiver preferably uses a two step decoding process, determining which subset or level the received symbol matches, then determining the proper point within that level that most corresponds to the received symbol.

The present invention may also be embodied within a transmitter, a receiver, or a transceiver, any of which includes means for transmitting and/or receiving over multiple channels simultaneously, a storage medium for storing a multi-level signal constellation, and a mapper to map an input or received signal to the stored constellation. The constellation defines a plurality of points. At least one point defines a first level and a plurality of points defines a second level. A distance between nearest points of adjacent levels, or a minimum inter-level distance between points, is based on a maximized minimum difference between conditional probability distributions, and is preferably a Kullback-Leibler distance.

In a particular embodiment, a mobile terminal for communicating over a fast fading, multi-carrier wireless channel includes a demodulator for demodulating a received signal that was transmitted simultaneously from at least two antennas. The mobile terminal also includes a channel estimator for estimating the multi-carrier wireless channel using at least some pilot signals from the received signal, and a multi-level signal constellation embodied on a computer storage medium. The signal constellation defines a plurality of points exhibiting a minimum separation between levels D given by:

$$\max_{\substack{C=\{c_1,\ldots,c_M\} \\ \frac{1}{M}\sum_{i=1}^{M}|c_i|^2 \leq P_{av}}} \min_{i \neq j} D(c_i \| c_j),$$

wherein i and j are integer indexes, C is the signal constellation, $c_i$ and $c_j$ are constellation points, M is the total number of constellation points in the constellation, and $P_{av}$ is one of an average constellation power, a ratio of signal power to noise power, a ratio of bit energy to noise power spectral density, or a ratio of symbol energy to noise power spectral density. The mobile terminal also includes computer code embodied on a computer storage medium for matching a symbol of the signal received to the signal constellation.

The present invention also includes method to employ the subject signal constellations. A method of transmitting a signal over a multi-carrier system includes mapping a signal to be transmitted to a signal constellation, adding pilot symbols to the mapped signal, modulating the pilot symbols and the mapped signal in accordance with a multi-carrier modulation technique, and transmitting the modulated pilot symbols and the mapped signal simultaneously from at least M transmit antennas, wherein M is an integer at least equal to two. The signal constellation defines a plurality of C constellation points and n=2M real dimensions, wherein the C points are disposed about at least two mutually exclusive subsets such that a separation between two nearest constellation points of adjacent subsets is based on a maximized minimum difference between conditional probability distributions, preferably a Kullback-Leibler distance.

The invention also includes a method for decoding a signal received over a multi-carrier system. This method includes receiving a set of signals that were transmitted from at least M transmit antennas from a multi-carrier channel, wherein M is an integer at least equal to two, using a portion of the set of signals to estimate channels of the multi-carrier system, and decoding the set of signals by mapping them to a signal constellation. The signal constellation defines a plurality of C constellation points and n=2M real dimensions, wherein the C points are disposed about at least two mutually exclusive subsets such that a separation between two nearest constellation points of adjacent subsets is based on a maximized minimum difference between conditional probability distributions, again, preferably a Kullback-Leibler distance.

DETAILED DESCRIPTION

Figure 1A:
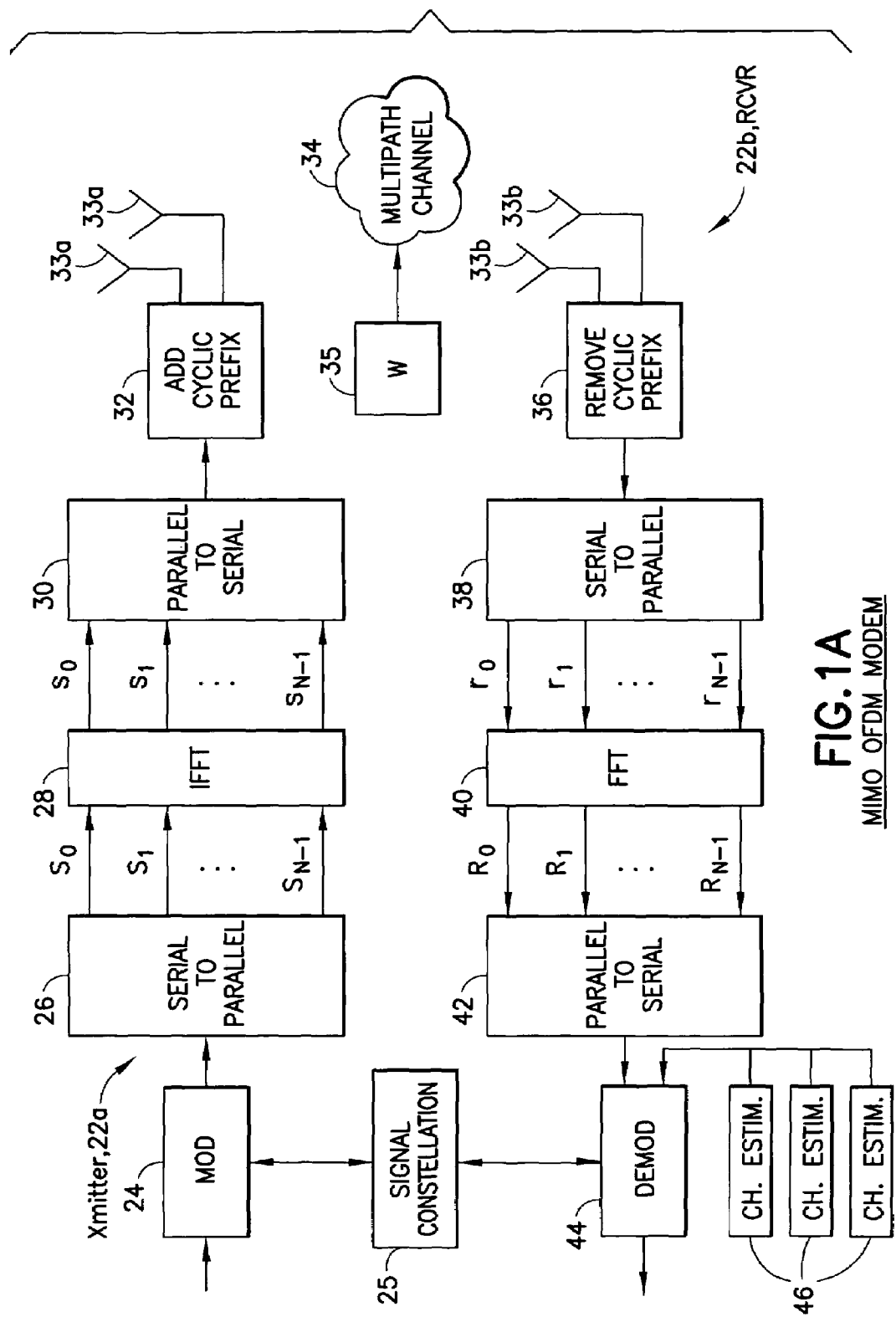
FIG. 1A is a high-level block diagram of an N sub-carrier OFDM modem using two transmit and two receive antennas, and is an example of a transceiver that may employ the present invention.

While the claimed invention is described below with reference to multi-carrier communications systems and transmitters employing multiple output antennas, a practitioner in the art will recognize that the principles of the claimed invention are applicable to other applications including those applications as discussed supra.

The present invention builds upon work detailed in International Patent Application PCT/IB03/02088, filed with the U.S. Receiving office on May 29, 2003 and entitled "METHOD AND APPARATUS TO ESTABLISH CONSTELLATIONS FOR IMPERFECT CHANNEL STATE INFORMATION AT A RECEIVER". That work described signal constellations wherein the individual constellation points were separated by a distance determined from conditional distributions, such as a Kullback-Leibler (KL) distance. Co-pending U.S. patent application Ser. No. 10/607,406, filed on Jun. 25, 2003 and entitled "SIGNAL CONSTELLATIONS FOR MULTI-CARRIER SYSTEMS", details partially coherent signal constellations particularly adapted for multi-path communication systems. Co-pending U.S. patent application Ser. No.10/671,346, filed on Sep. 24, 2003 and entitled "PARTIALLY COHERENT CONSTELLATIONS FOR MULTIPLE ANTENNA SYSTEMS", details partially coherent signal constellations particularly adapted for communication systems employing more than one transmit antenna. Each of the above related applications are herein incorporated by reference.

As a summary of the above, signal constellations for partially coherent systems, those wherein the receiver has only an estimate of channel state information, may be optimized by separating at least some of the constellation points by a distance that is not Euclidean, but rather a distance between conditional distributions. Statistics of channel fading are used to encode additional information into the space-time matrix signal constellation as variations in amplitude of constellation points. A particularly advantageous measure of such a distance between conditional distributions is the Kullback-Leibler distance. Because the above works do not rely upon perfect channel state information at the receiver, errors introduced by that prior art assumption do not propagate throughout the communication system, so the more accurate signal constellations allow reduced error rates as compared to prior art constellations. The advantage is more pronounced in multiple channels and MIMO systems.

As used herein, a partially coherent system is a communication system in which the receiver does not have accurate knowledge of channel state information (CSI), and a partially coherent constellation is a signal constellation that assumes less than perfect knowledge of CSI at the receiver. A distance based on conditional distributions is a distance between points or entities wherein the position of at least one point is determined based on statistics of the point's likely position, such as a probability density. A location of one or both points may be determined by such a statistical measure and the distance between them is a distance based on a conditional distribution. By assigning positions of signal constellation points by probability densities, statistics of channel fading are directly incorporated into the signal constellation. Conversely, assigning points based on strict Euclidean separation is an implicit assumption of perfect CSI at the receiver (a coherent system).

The preferred distance between conditional distributions for the purposes herein is known as a Kullback-Leibler (KL) distance, also sometimes referred to as relative entropy. In general, the KL distance $D(f\|g)$ between two densities f and g is defined by:

$$D(f\|g) = \int f \log \frac{f}{g}.$$

The distance $D(f\|g)$ is finite only if the support set of f is contained in the support set of g. For continuity, 0 log 0/0 is set equal to zero. Many different types of conditional distributions may be appropriate for designing signal constellations, such as a KL distance, a Chernoff distance, a J-divergence, a Bhattacharyya distance, and a Kolmogorov distance, to name a few.

As in the above-referenced and incorporated patent applications, it is assumed that the channel is flat fading and the estimation error is Gaussian with zero mean and a known variance. Even though the channels considered below are not flat, because of the multi-carrier approach, the channel seen in each frequency bin can be approximately considered as a flat fading channel. Also, the fading process and the additive noise are both assumed to be Gaussian. As detailed below, this results in a Gaussian distribution for the estimation error, and hence, the results of the application noted above entitled "METHOD AND APPARATUS TO ESTABLISH CONSTELLATIONS FOR IMPERFECT CHANNEL STATE INFORMATION AT A RECEIVER" can be used for the system under consideration. In the application referenced above entitled "PARTIALLY COHERENT CONSTELLATIONS FOR MULTIPLE ANTENNA SYSTEMS", a simplified design criterion and construction method has been proposed for multiple-antenna vector constellations when only partial (imperfect) channel state information is available at the receiver.

The present invention can be implemented in either the transmitter or the receiver, or in both, of a multi-carrier system, such as an OFDM system or a multi-carrier code division multiple access (MC-CDMA) system, using software, hardware, or a combination of software and hardware. The software is assumed to be embodied as a lookup table, an algorithm, or other program code that defines the points of a signal constellation and is accessed to map a signal to be transmitted to the signal constellation or map a received symbol from the signal constellation. The same signal constellation is resident at either one or both of the transmitter and receiver, though it need not be embodied in the same format (lookup table, algorithm, etc.).

A block diagram of a N sub-carrier OFDM modem 20, also referred to herein as a multi-carrier transceiver or a multi-carrier system, is shown in FIG. 1A as just one example of a multi-carrier modem that may use the present invention to advantage. At the transmitter 22a modulator 24 receives an incoming signal and accesses a storage medium 25 that stores a signal constellation to map the input signal to be transmitted to the symbols of the signal constellation.

The signal may pass through a forward error controller (FEC) and/or a bit extractor (not shown) prior to entering the modulator 24, as known in the art. The modulator 24 then sends N complex symbols $S_n$, $0 \leq n \leq N-1$ that are multiplexed in a serial to parallel converter 26 to N sub-carriers. An Inverse Fast Fourier Transform (IFFT) block 28 translates the N frequency-domain symbols into N time-domain samples $s_n$, $0 \leq n \leq N-1$ that are applied to a parallel to serial converter 30, after which M cyclic prefix samples are inserted by block 32 before being transmitted over a plurality of transmit antennas 33 over a time-varying dispersive channel 34 that is corrupted by noise 35, termed W in FIG. 1A. A multi-carrier symbol thus consists of N symbols in the frequency-domain, or N+M samples in the time-domain. At the receiver 22b, the data stream is received from the multipath channel 34 over one or more receive antennas 33b, which in practice are the same physical entity as the transmit antennas 33a within a unified transceiver. It is stipulated that a single transceiver may transmit over more than one antenna yet receive over only one antenna, even within the same ongoing communication such as a mobile phone call. In the receiver 22b, the cyclic prefix is stripped from the received time-domain samples in the block 36, and the output is applied to a serial to parallel converter 38 that outputs the remaining data samples $r_n$, $0 \leq n \leq N-1$. The separate received symbols are then input to a FFT block 40 to yield the received frequency-domain data symbols $R_n$, $0 \leq n \leq N-1$. The data symbols are then input to a parallel to serial converter 42, and the resulting symbol stream is then applied to a demodulator 44. The demodulator uses a series of channel estimators 46 to estimate the channel, and uses the channel estimates and the received signals to detect the symbols. The signal output from the demodulator 44 may pass through a slicer/bit insertion block and FEC decoder (not shown) as known in the art. Mapping to and from the signal constellation may alternatively occur at other points along the system 10 without departing from the broader aspects of this invention.

Figure 1B:
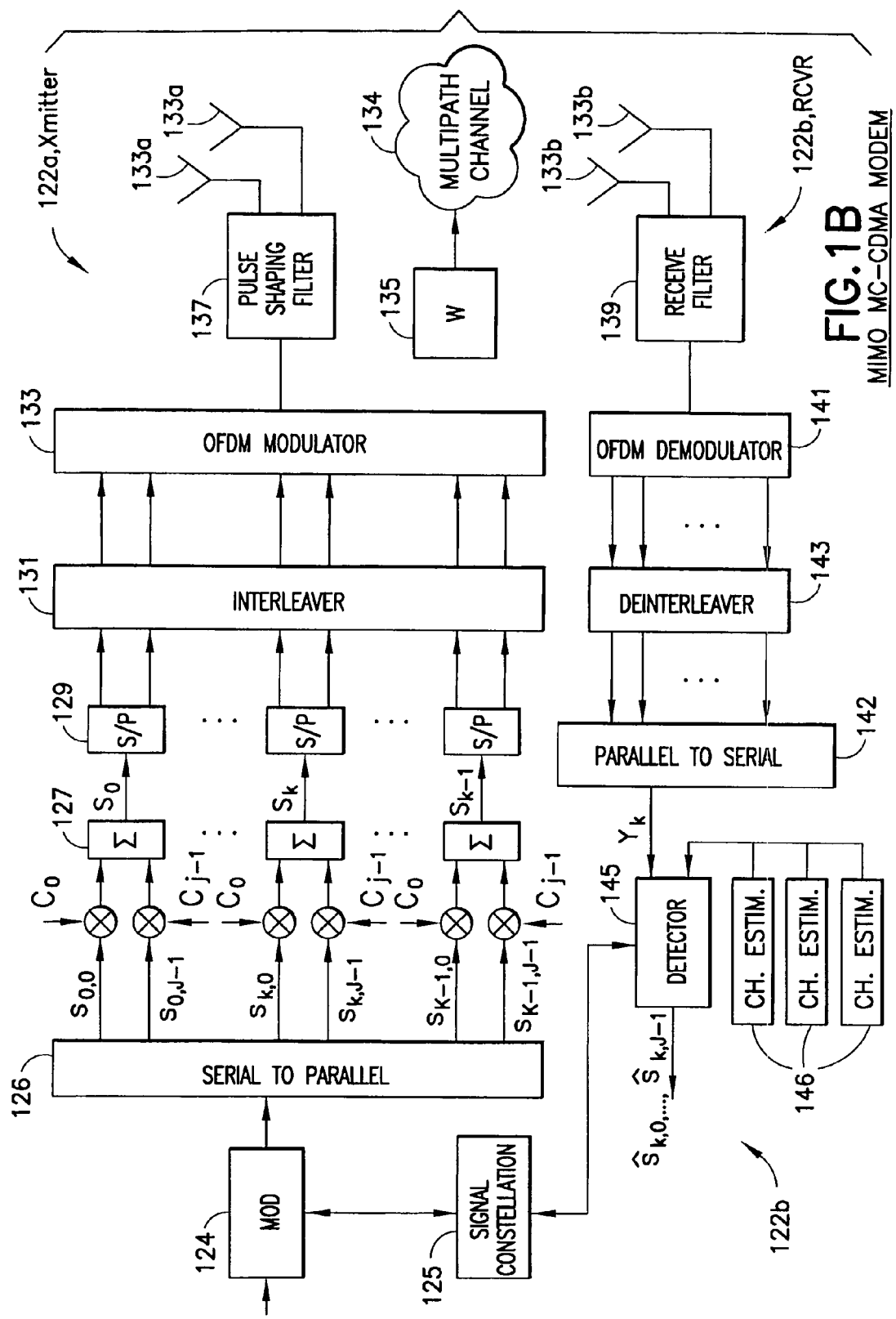
FIG. 1B is a high-level block diagram of a $N_b$ sub-carrier MC-CDMA modem using two transmit and two receive antennas, and is an example of a transceiver that may employ the present invention.

FIG. 1B illustrates a high-level logical block diagram of a MC-CDMA modem 120 that may employ the present invention. At a transmitter 122a, a signal to be transmitted, that represent multiple users, is input into a modulator 124, which accesses a storage medium 125 that stores a signal constellation to map the input signal to be transmitted to the symbols of the signal constellation. The modulated and mapped symbols then pass through a serial to parallel converter 126 where they are split into K blocks of J streams. The streams, $s_{0,0}$, $s_{0,j-1}$, ..., $s_{k-1,j-1}$, are spread using Walsh-Hadamard codes $c_0$, ..., $c_{j-1}$ of length N, then summed at adders 127 to form a single spread stream $S_0$, ... $S_{k-1}$. The spread streams each then pass through a second serial to parallel converter 129, an interleaver 131 and an OFDM modulator (IFFT) 133 where they are divided into $N_b$ frequency bins. A cyclic prefix is preferably added at the OFDM modulator 133 to prevent inter-symbol interference (ISI) and inter-channel interference (ICI). This time domain signal then passes through one or more pulse-shaping filters 137 and transmitted via a plurality of transmit antennas 133a over a channel 134, where noise W 135 is added.

At the MC-CDMA receiver 122b, a signal is received by one or more receive antennas 133b and passed through one or more receive filters 139 that are preferably matched to the pulse-shaping filter 137 to suppress out-of-band interference and noise. The filtered received signal then passes through an OFDM demodulator (FFT) 141, a de-interleaver 143, and a parallel to serial converter 142 that outputs spread streams approximating those output from the adders 127 in the transmitter 122*a*. A detector 145 uses a series of channel estimators 146 to estimate the multicarrier channels, accesses the storage medium 125 and generates hard or soft decision outputs for each original symbol or stream.

The present invention is directed in part to the signal constellation, and is thus not dependent upon the particular type of multi-carrier system used, whether OFDM, MC-CDMA, or others. One important distinction between the prior art and the present invention lies within the detector 145 and demodulator 44. In the prior art, a typical detection algorithm reduces to a Euclidean-based nearest-neighbor detector. In certain embodiments, the present invention uses a maximum-likelihood detection algorithm recited below at equation [6] as the likelihood function. This maximum likelihood detection algorithm, unlike the coherent detection, does not reduce to a Euclidean-based nearest-neighbor detector. The inventors have demonstrated considerable performance improvement using prior art Euclidean-based detectors and demodulators in conjunction with a signal constellation according to the present invention. They have also shown further improvements using optimized detectors/demodulators that maximize a true likelihood function of the received signal, such as the algorithm of Equation [6].

Figure 2:
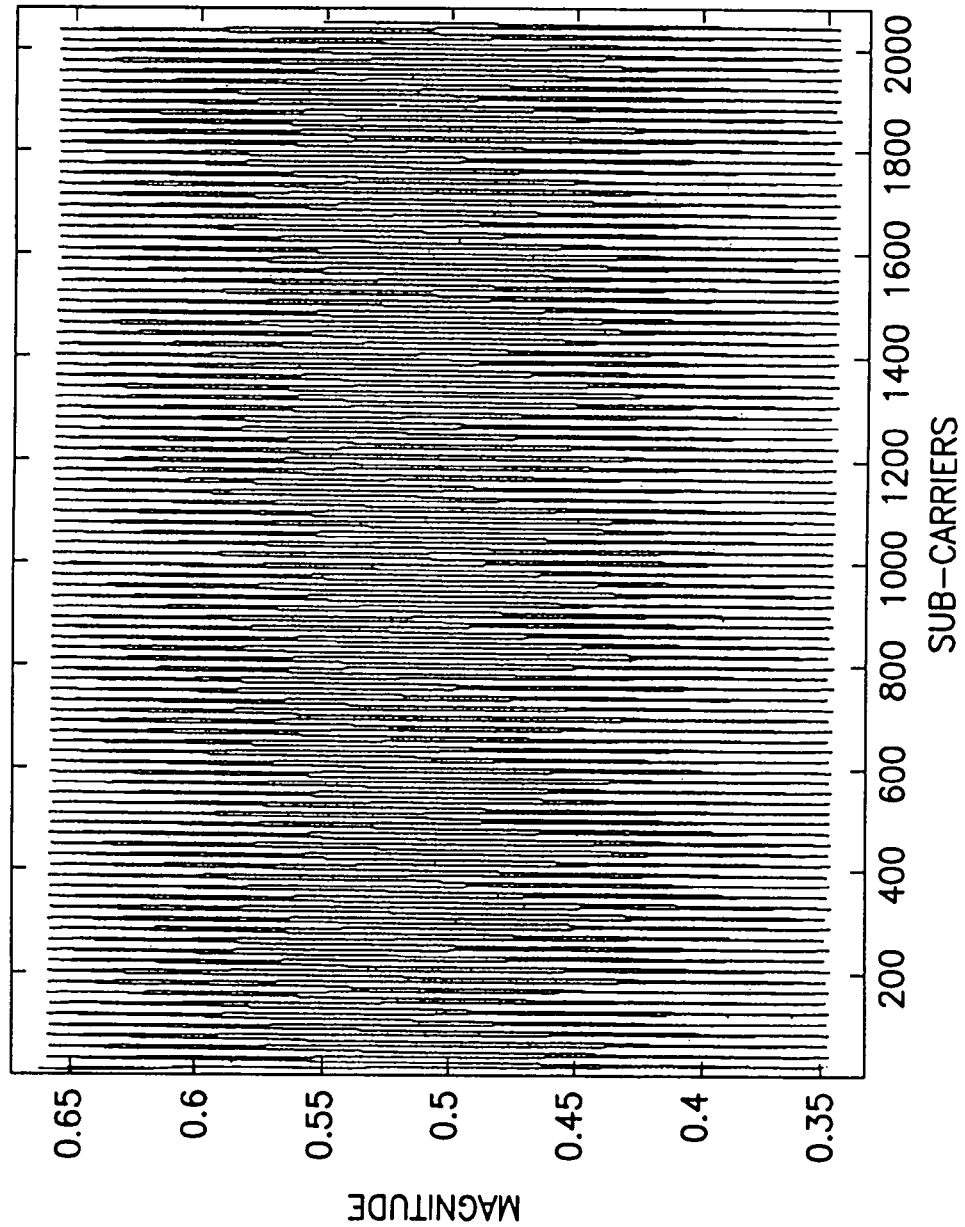
FIG. 2 is a snapshot diagram of a magnitude frequency function of a two-path Rayleigh fading channel.

To illustrate the sub-channels of a multi-carrier system and how they can vary from one to another, one may consider by example an OFDM modem with 2048 sub-carriers and a simple two-path Rayleigh fading channel with a 20 Hz Doppler. FIG. 2 shows a snapshot of the magnitude frequency function of the fading channel. It can be seen that the frequency function varies widely across the 2048 sub-channels.

In a most preferred embodiment, the present invention uses the multilevel spherical structure described in "PARTIALLY COHERENT CONSTELLATIONS FOR MULTIPLE ANTENNA SYSTEMS" to design multiple-antenna partially coherent constellations for multi-carrier systems. The description below considers a pilot-based channel estimation method, in which pilots are inserted uniformly in the frequency domain, and the channel estimation algorithm is a maximum likelihood (ML) estimator for the impulse response followed by a Fourier transform to obtain the channel frequency response. Assuming a Gaussian additive noise, this results in a least squares (LS) estimator. The following symbols are used throughout this description (FFT refers to fast Fourier transform).

N: Number of the frequency bins, (FFT size in the case of no up-sampling)
$N_p$: Number of equally spaced pilot symbols in frequency domain
$N_t$: Number of estimated taps of the channel
L: Number of the channel taps (after sampling the delay profile at the sampling rate)
h: Channel impulse response (L×1 vector)
$h_t$: Estimated taps of the channel ($N_t$×1 vector)
$h_r$: Unestimated taps of the channel (($L-N_t$)×1 vector)
H: Channel frequency response (N×1 vector)
$H_p$: Channel frequency response at pilot positions ($N_p$×1 vector)
W: The first L columns of the N×N FFT matrix (N×L matrix)
$W_p$: Rows of W corresponding to the pilot positions ($N_p$×L matrix)
$W_t$: Columns of W corresponding to the estimated taps (N×$N_t$ matrix)
$W_r$: Columns of W corresponding to the unestimated taps (N×(L-$N_t$) matrix)

$W_{pt}$: Columns of $W_p$ corresponding to the estimated taps ($N_p$×$N_t$ matrix)
$W_{pr}$: Columns of $W_p$ corresponding to the unestimated taps ($N_p$×(L-$N_t$) matrix)
$n_p$: Received noise at pilot positions ($N_p$×1 vector)
$X_p$: Elements of X at pilot positions ($N_p$×1 vector)
$F_p$: Frequency responses of the pulse shaping and receive filters at pilot positions ($N_p$×$N_p$ matrix)

With the above notations, the channel frequency response is given by $$H = Wh = W_t h_t + W_r h_r \qquad [1]$$

Assuming that pilot symbols are real valued and have unit power (i.e., are ones), yields:

$$X_p = F_p H_p + n_p = F_p W_p h + n_p = F_p W_{pt} h_t + F_p W_{pr} h_r + n_p \qquad [2]$$

The above-referenced application, "SIGNAL CONSTELLATIONS FOR MULTI-CARRIER SYSTEMS", shows that the average estimation variance at each frequency bin is given by $$\bar{\sigma}_E^2 = \frac{1}{N}\text{trace} \qquad [3]$$

$$\left\{ (AF_p W_{pr} - W_r) \begin{bmatrix} P_{N_t} & & 0 \\ & \ddots & \\ 0 & & P_{L-1} \end{bmatrix} (W_{pr}^H F_p^H A^H - W_r^H) + \sigma^2 A A^H \right\},$$

where $$A = W_t (W_{pt}^H F_p^H F_p W_{pt})^{-1} W_{pt}^H F_p^H \qquad [4]$$

The above-referenced application, "SIGNAL CONSTELLATIONS FOR MULTI-CARRIER SYSTEMS" also shows that when no pulse-shaping filter and up/down sampling is used, the above expression reduces to $$\bar{\sigma}_E^2 = \sum_{\substack{l=N_t \\ mod(l,N_p)<N_t}}^{L-1} 2P_l + \sum_{\substack{l=N_t \\ mod(l,N_p)\geq N_t}}^{L-1} P_l + \frac{\sigma^2 N_t}{N_p}, \qquad [5]$$

where $P_l$ is the energy of the $l^{th}$ tap of the channel.

The present invention uses the above expressions and the design criterion and construction method of "PARTIALLY COHERENT CONSTELLATIONS FOR MULTIPLE ANTENNA SYSTEMS", referenced above, to design partially coherent constellations for multiple-antenna multi-carrier systems that are suitable for use in multipath fading environments. The referenced design criterion is preferably based on the Kullback-Leibler distance between conditional received distributions. The KL distance is used as the design criterion for two reasons: it is relatively simple to derive and work with (as opposed to the exact expressions for average and pairwise error probability and also the Cheronoff bound, which are not believed to be tractable in this case), and the KL distance is related to the exponential decay rate of the pairwise error probability in hypothesis testing. The inventors have found that the performance of an ML detector is also related to the KL distance between conditional received distributions. The inventors have found this design criteria is particularly effective, for SIMO and MIMO systems in different fading environments, and enable significant performance improvements over the conventional constellations and existing MIMO techniques. The design criteria described in the above referenced applications entitled "METHOD AND APPARATUS TO ESTABLISH CONSTELLATIONS FOR IMPERFECT CHANNEL STATE INFORMATION AT A RECEIVER", and "PARTIALLY COHERENT CONSTELLATIONS FOR MULTIPLE ANTENNA SYSTEMS", can also be used to design partially coherent constellations for multiple-antenna multi-carrier systems in multipath environments.

Denoting by $S_i$, $X_i$, $\hat{H}_i$, and $\tilde{H}_i$, the transmitted signal (row) vector, received signal (row) vector, channel estimate matrix, and the estimation error matrix, respectively, at the $i^{th}$ frequency bin, yields the following expression for the conditional probability distribution of the received signal:

$$p(X_i \mid S_i, \hat{H}_i) = E_{\tilde{H}_i}\{p(X_i \mid S_i, \hat{H}_i, \tilde{H}_i)\} \quad [6]$$

$$= \frac{1}{\pi(\sigma^2 + \sigma_E^2 \|S_i\|^2)} \exp\left(-\frac{\|X_i - S_i \hat{H}_i\|^2}{\sigma^2 + \sigma_E^2 \|S_i\|^2}\right).$$

The ML detector maximizes this expression over all of the possible values for $S_i$ to find the transmitted symbol:

$$\hat{S}_i = \underset{S_i \in C}{\mathrm{argmax}}\, p(X_i \mid S_i, \hat{H}_i), \quad [7]$$

where C is the signal constellation.

As mentioned above, the signal constellations of the incorporated applications are derived using the Kullback-Leibler (KL) distance between the conditional distributions as the performance criterion. For the case of vector constellations, the expected KL distance between constellation points is given by the following expression:

$$\overline{D}(c_i \| c_j) = \frac{1 + \sigma_E^2 \|c_i\|^2}{1 + \sigma_E^2 \|c_j\|^2} - \ln\left(\frac{1 + \sigma_E^2 \|c_i\|^2}{1 + \sigma_E^2 \|c_j\|^2}\right) - \quad [8]$$

$$1 + \ln\left(1 + (1 - \sigma_E^2) \frac{\|c_i - c_j\|^2}{1 + \sigma_E^2 \|c_j\|^2}\right),$$

where $c_i$ and $c_j$ are two different constellation points (vectors). (Here, the constellation is scaled by the inverse of noise variance so that the average energy of the constellation is equal to the signal to noise ratio.) The constellation design criterion is then given as $$\underset{C=\{c_1,\ldots,c_M\}}{\max} \underset{i \neq j}{\min} D(c_i \| c_j), \quad [9]$$

$$\frac{1}{M}\sum_{i=1}^{M} |c_i|^2 \leq P_{av}$$

where M is the total number of constellation points ($\log_2 M$ is the spectral efficiency in b/s/Hz), and $P_{av}$ is the average power of the constellation or the SNR value in this case.

Even though this design criterion is for the case when the estimation error is independent from the channel estimates (which is not the case for the estimator used herein), significant performance gains are achievable using this design criterion for the system under consideration. This decision criterion also neglects the correlation between the fading coefficients and estimation errors on different frequency bins. This is because either independent decisions are made on the data on different frequency bins (i.e., OFDM system), or frequency interleaving is used to sufficiently separate the chips involved in each symbol (i.e., MC-CDMA system) to make the correlation between the corresponding channel values (and hence the estimation errors) as small as possible.

As an example, consider a 1.25 MHz 2×2 multi-carrier system in the ITU Vehicular A channel at 1.9 GHz. Assume an up/down sampling rate of 4 samples/chip (resulting in a sampling rate of 4,915,200 samples per second), and a total of 128 sub-carriers in each OFDM symbol, out of which 8 equally spaced sub-carriers are used as pilots. The inventors have derived that the optimum number of estimated taps for a wide range of SNR (from around 10 dB to 30 dB) is five. Therefore, assume that only five taps of the channel are estimated. The resulting average estimation variances at different SNR values are given in Table 1 below.

TABLE 1

Average estimation variances and minimum distances for a 2 × 2 multi-carrier system with up/down sampling, 128 sub-carriers, 8 pilots, and estimating 5 taps of the Vehicular A channel.

| | SNR per Bit (dB) | | | | | | |
|---|---|---|---|---|---|---|---|
| | 0 | 5 | 10 | 15 | 20 | 25 | 30 |
| Estimation Variance | 0.2279 | 0.0796 | 0.0327 | 0.0178 | 0.0132 | 0.0117 | 0.0112 |
| $d_{min}$, Concatenated 16 QAM | 0.3004 | 0.7117 | 1.3840 | 1.7991 | 2.4487 | 2.4928 | 2.5072 |
| $d_{min}$, New Constellation | 0.4955 | 1.1021 | 1.9454 | 2.5423 | 3.3460 | 3.5835 | 3.7498 |

The recursive spherical construction technique described in "PARTIALLY COHERENT CONSTELLATIONS FOR MULTIPLE ANTENNA SYSTEMS", referenced above, was used to construct 256-point two-antenna partially coherent constellations for the SNR values and the estimation variances given in Table 1. Each constellation point is identified by two complex numbers (though not every point includes an imaginary component) to be transmitted from the two transmit antennas. For a SNR per bit of 15 dB and an estimation variance $\sigma^2 = 0.02$ at each frequency bin, the constellation defines a four-dimensional real signal set of four spherical levels as described below with reference to FIG. 3.

For comparison, the minimum KL distance of the new constellations and a concatenated 16QAM constellation at the corresponding SNR values and estimation errors are also given in Table 1. A concatenated 16QAM constellation is a transmission scheme that uses conventional 16QAM constellations to transmit two independent data streams from the two transmit antennas (much like the well-known BLAST scheme), but uses a joint ML detection at the receiver. The receiver complexity of this scheme is the same as the one using the new constellations, however the new constellations achieve a substantial performance improvement compared to this scheme. This is evident in the simulation results below and at FIGS. 4A–B and 5A–B.

Figure 3:
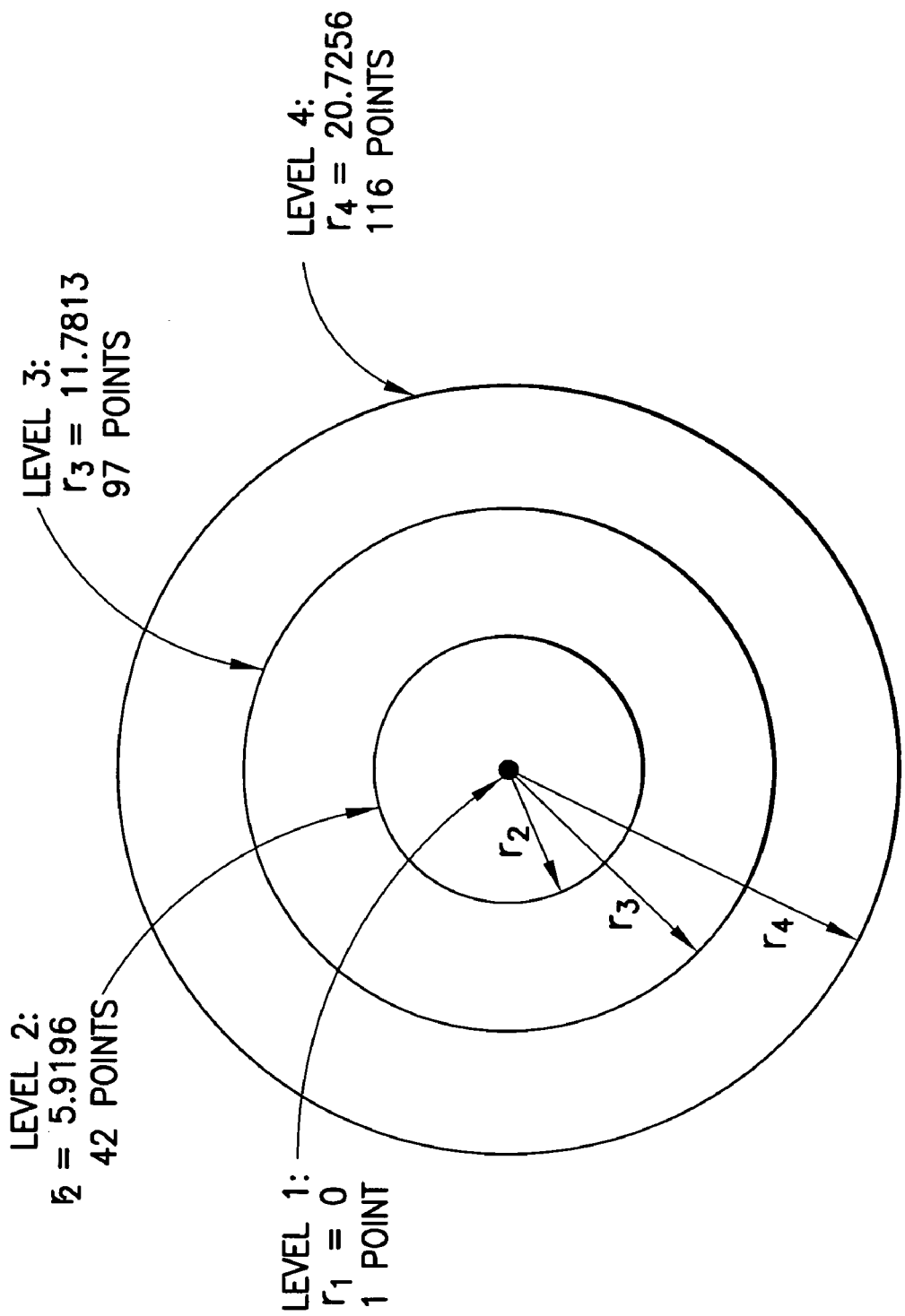
FIG. 3 is a cross section of a four dimensional constellation defining four concentric spherical levels on which the points of a 256-point, two-antenna, partially coherent constellation according to the present invention may be disposed.

FIG. 3 shows a 256-point constellation according to the present invention, for SNR per bit of 15 dB and variance $\sigma^2$=0.02, in four concentric spherical levels. As indicated, level 1 includes one constellation point at the constellation center. Level 2 consists of a series of 42 constellation points disposed along a spherical surface defining a radius $r_2$=5.9196. Level 3 consists of a series of 97 constellation points disposed along a spherical surface defining a radius $r_3$=11.7813. Level 4 consists of a series of 116 constellation points disposed along a spherical surface defining a radius $r_4$=20.7256. Separation of points within each spherical level may be via a maximized minimum Euclidean distance, however the spherical levels may be rotated relative to one another to achieve a maximized minimum KL distance (or other conditional distribution distance). This constellation could be readily scaled for other SNR values and estimation variances. While depicted in three dimensional space, it is understood that the constellation points are disposed among four real dimensions because two transmit antennas are used in the transmission and each transmit antenna requires two real dimensions (one complex dimension) in the constellation. Intra-subset spacing of points (e.g., between adjacent points within the same spherical level) may be a maximized minimum Euclidean distance, but inter-subset spacing (e.g., between points in adjacent spherical levels) is based on a conditional probability such as a KL distance. As in the incorporated patent "PARTIALLY COHERENT CONSTELLATIONS FOR MULTIPLE ANTENNA SYSTEMS", referenced above, constellations according to the present invention may be spherical but need not define any particular shape. Recursive construction may be facilitated by iterative subsets of points within each level (e.g., points arranged in a plurality of equally spaced planar circles about the spherical surface), or by similar point distribution among the different levels (e.g., maximum Euclidean packing of points on a spherical surface).

Figure 4A:
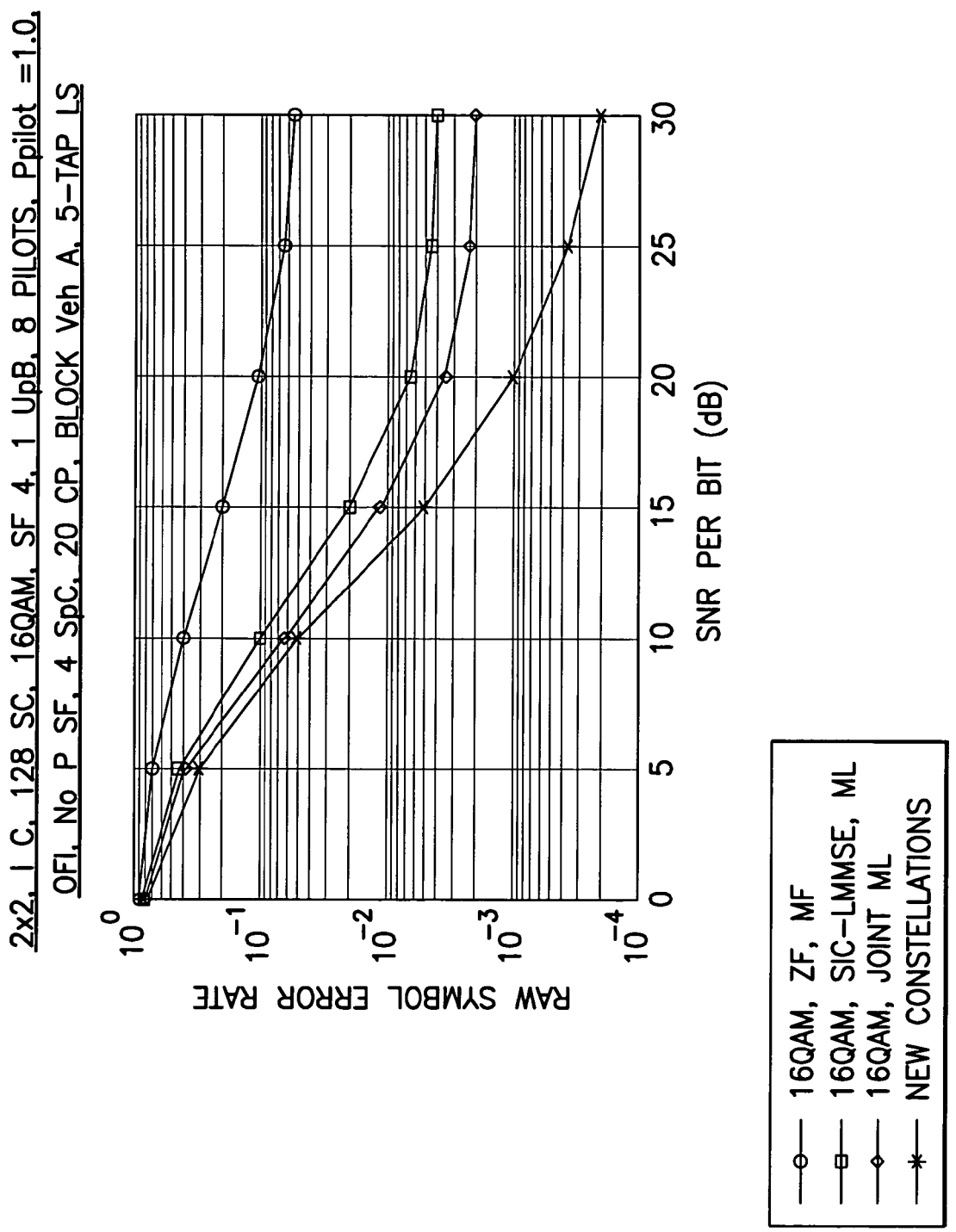
FIG. 4A is a graph comparing performance between different prior art constellations and those of the present invention for a lightly loaded 2×2 MC-CDMA system with 128 sub-carriers, 8 pilots, and estimating 5 taps of the Block Vehicular A channel.
Figure 4B:
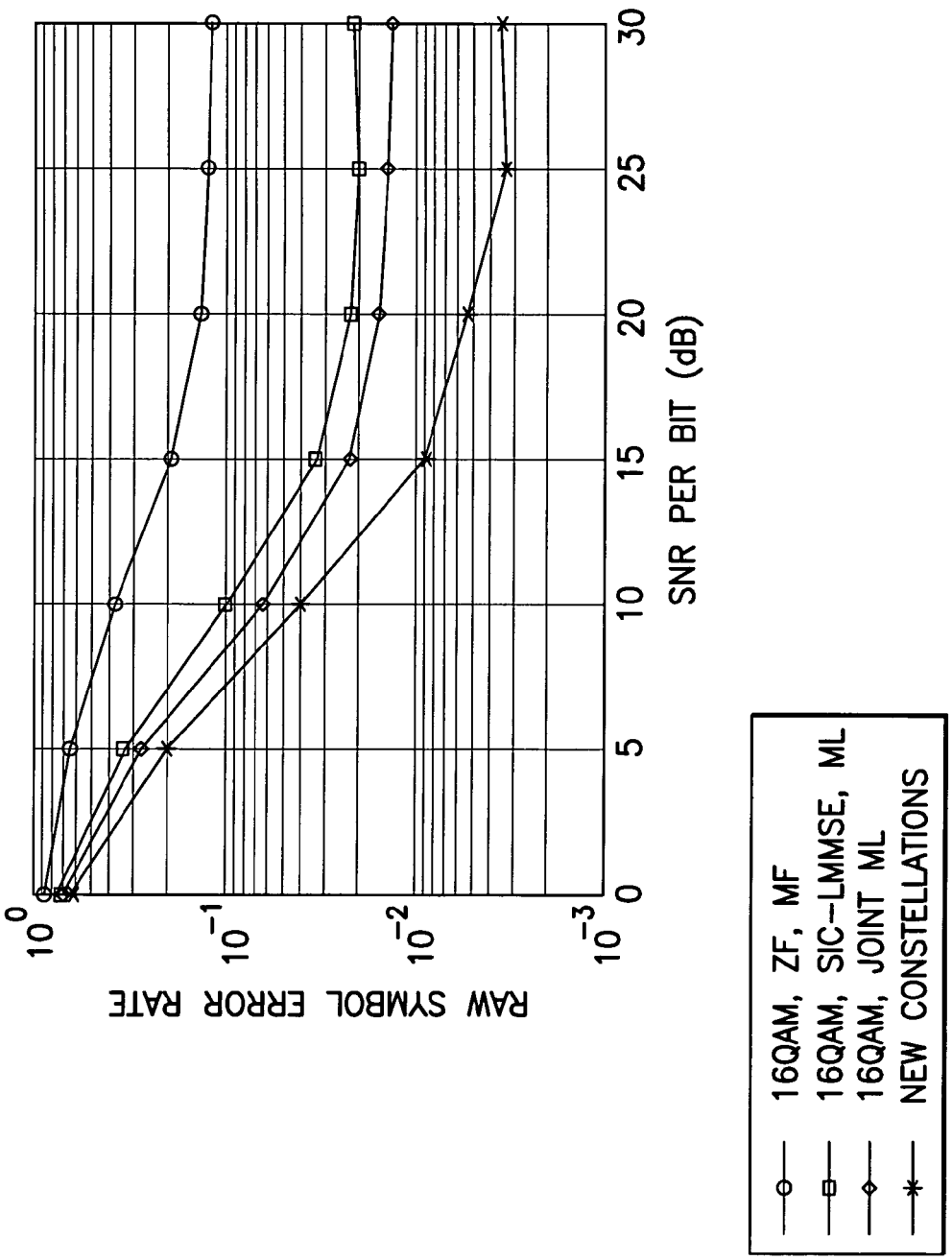
FIG. 4B is a graph similar to FIG. 4A, but for the Vehicular A channel at 120 Km/h rather than the Block Vehicular A channel.

FIGS. 4A–B compares the performance of the constellations according to the present invention with three different conventional (BLAST-type) MIMO techniques in Block Vehicular A channel (FIG. 4A) and Vehicular A channel at 120 Km/h (FIG. 4B).

In the BLAST-type MIMO techniques, two independent bit streams are modulated using a conventional 16QAM constellation, and transmitted over the two transmit antennas (after being converted to a time domain signal using an OFDM transmitter). In these curves, ZF (represented by circular data points) and SIC-LMMSE (represented by square data points) refer to the Zero-Forcing and Successive Interference Cancellation with Linear Minimum Mean Squared Error algorithms, and MF and ML refer to the Matched Filter and Maximum Likelihood detection algorithms. The combination of the ZF MIMO receiver and the MF detector results in a receiver usually referred to as the Orthogonality Restoring Combiner (ORC). For a lightly loaded system, the ML detector is equivalent to the Maximal Ratio Combining (MRC) receiver. The third scheme in FIGS. 4A–4B and 5A–5B which is compared to the constellations of the present invention is a BLAST-type scheme (independent streams transmitted from different antennas), but with a joint ML detector (represented by diamond data points). This scheme has a receiver complexity similar to the receiver with the constellations of the present invention. FIGS. 4A–4B make clear that the present invention constellations provide a substantial performance improvement over the conventional 16QAM constellation used in a MIMO system with joint ML detection. The constellations of the present invention also provide even larger performance gains compared to the V-BLAST scheme with linear (ZF) or successive (SIC-LMMSE) receivers.

Figure 5A:
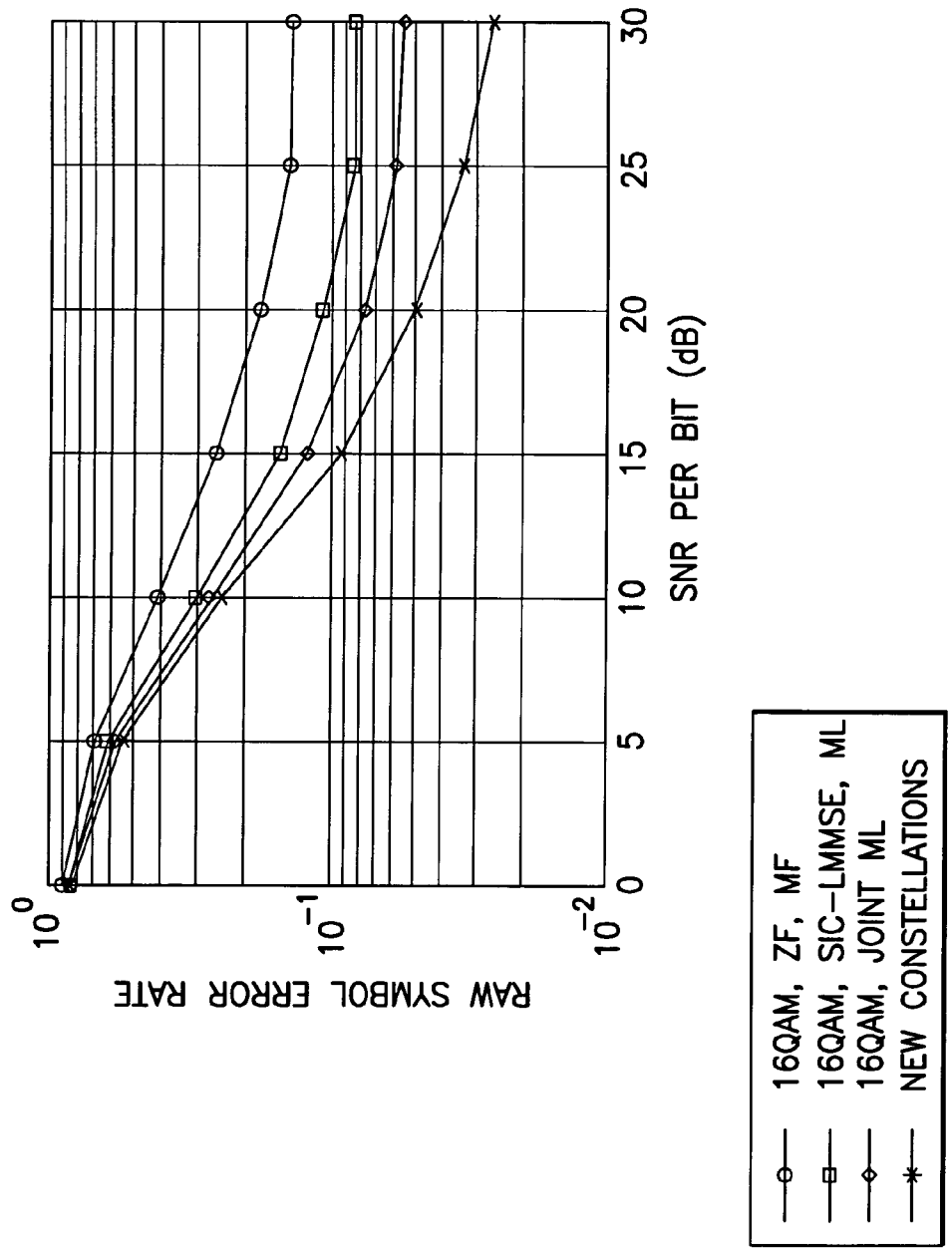
FIG. 5A is a graph similar to FIG. 4A, but for an OFDM system rather than a MC-CDMA system.
Figure 5B:
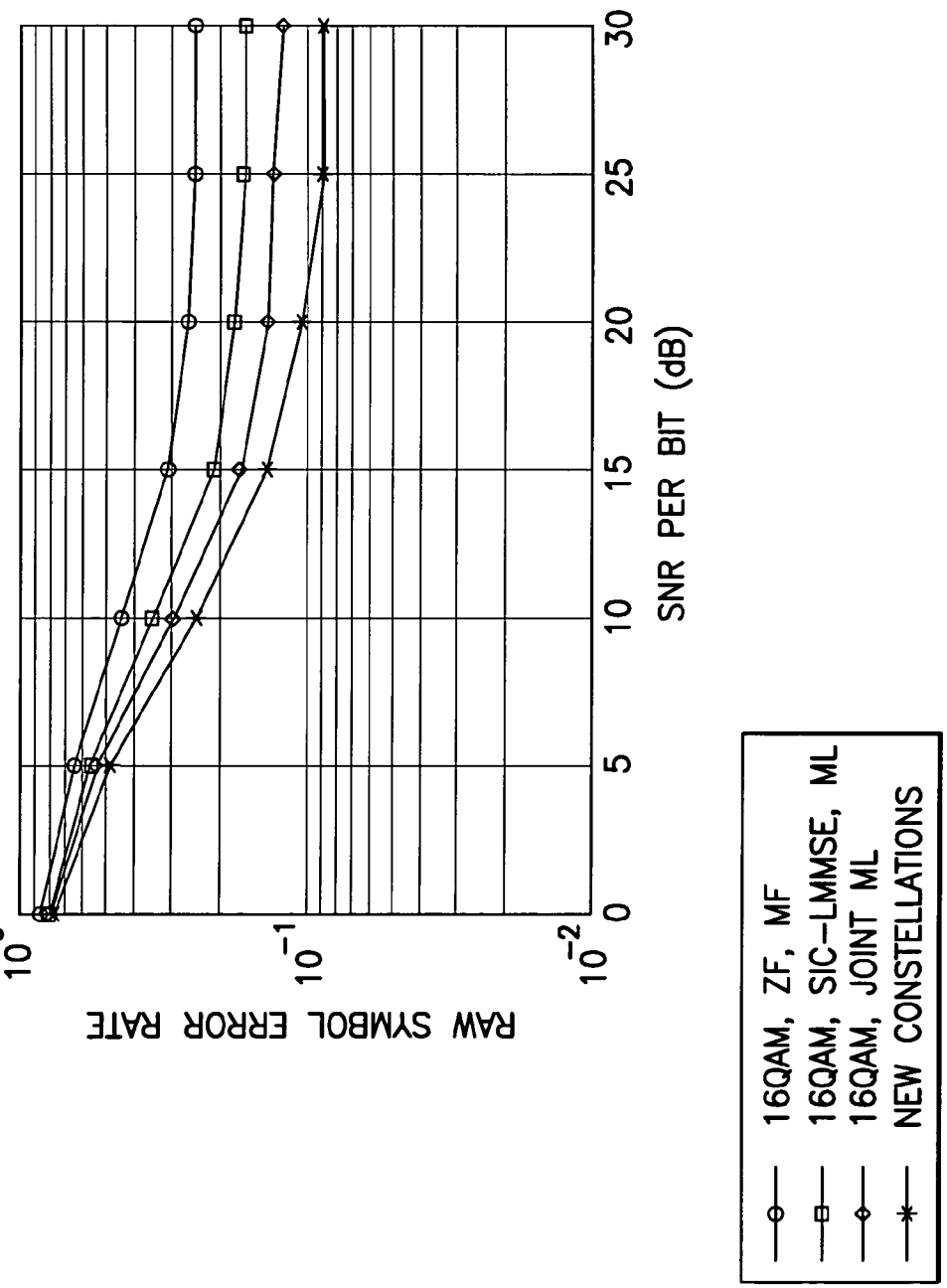
FIG. 5B is a graph similar to FIG. 4B, but for an OFDM system rather than a MC-CDMA system.

FIGS. 5A–5B present the same comparisons but for an OFDM system, and show that similar performance improvements can be achieved even without spreading the transmitted signals in frequency domain. Due to the reduced diversity, the performance of all of the compared schemes in this case is degraded as compared to the case of FIGS. 4A–4B (note the disparity in vertical scale between FIGS. 4A–B and 5A–B), however the relative performances follow a similar trend, and the constellations according to the present invention show significant performance improvement compared to all of the BLAST-type approaches. In "PARTIALLY COHERENT CONSTELLATIONS FOR MULTIPLE ANTENNA SYSTEMS", referenced above, it has been shown that, in the presence of channel estimation errors, the multiple-antenna partially coherent constellations can also provide significant performance improvement over the well-known orthogonal transmit diversity scheme described in a paper by S. M. Alamouti, "A SIMPLE TRANSMIT DIVERSITY TECHNIQUE FOR WIRELESS COMMUNICATIONS", *IEEE Journal on Selected Areas of Communications*, vol. 16, no. 8, pp. 1451–1458, October 1988.

It should be noted that the performance gain realized by the present invention becomes substantial as the number of transmit and/or receive antennas 33a, 133a, 33b, 133b increases. A significant improvement in performance is also achieved when the improved signal constellations are used in conjunction with an outer error correcting code. For example, the outer code may be a block or a trellis code designed to encode several signal matrices across time. By designing the outer code based on the Kullback-Leibler (KL) distance criterion, the minimum distance between coded blocks can be further increased, leading to improved error rate performance.

While there has been illustrated and described what is at present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A receiver for receiving data and pilot symbols simultaneously over multiple channels comprising:
   at least one antenna;
   a demodulator coupled to an output of the antenna for demodulating received symbols in accordance with a multi-carrier transmission technique,
   a channel estimator coupled to the demodulator for estimating a channel of a multi-carrier system using received pilot symbols;
   a storage medium for storing a multi-level signal constellation defining C points, of which at least one point defines a first level and a plurality of points define a second level, and a minimum inter-level distance between points is based on a maximized minimum difference between conditional probability distributions; and a mapper coupled to the demodulator and to the storage medium for converting the demodulated symbols to a plurality of data signals that each alone or in combination correspond to a constellation point wherein the demodulator determines a maximum likelihood conditional probability distribution of the received symbols and wherein the conditional probability distribution is $$p(X_i \mid S_i, \hat{H}_i) = E_{\tilde{H}_i}\{p(X_i \mid S_i, \hat{H}_i, \tilde{H}_i)\}$$
$$= \frac{1}{\pi(\sigma^2 + \sigma_E^2 \|S_i\|^2)} \exp\left\{-\frac{\|X_i - S_i \hat{H}_i\|^2}{\sigma^2 + \sigma_E^2 \|S_i\|^2}\right\}$$

such that the detector maximizes over at least two possible values for $S_i$ to find a transmitted symbol wherein $S_i$ comprises a transmitted signal vector, $\hat{H}_i$ comprises a channel estimate matrix, $X_i$ comprises a received signal vector, $\tilde{H}_i$ comprises an estimation error matrix at an $i^{th}$ frequency bin, $E_{\tilde{H}_i}$ is an error estimation matrix, and $\sigma_E$ is the estimation variance at each frequency bin.

2. A method for decoding a signal received over a multi-carrier system comprising:

receiving a set of signals that were transmitted from at least M transmit antennas from a multi-carrier channel, wherein M is an integer at least equal to two;

using a portion of the set of signals to estimate channels of the multi-carrier system;

decoding at least a portion of the set of signals by mapping them to a signal constellation, the signal constellation defining a plurality of C constellation points and n=2M real dimensions, wherein the C points are disposed about at least two mutually exclusive subsets such that a separation between two nearest constellation points of adjacent subsets is based on a maximized minimum difference between conditional probability distributions; and selecting a proper signal constellation such that a signal to noise ratio defined by the received set of signals is equal to or greater than a sum of the squares of the absolute value of each constellation point divided by C.

3. A method for decoding a signal received over a multi-carrier system comprising:

receiving a set of signals that were transmitted from at least M transmit antennas from a multi-carrier channel, wherein M is an integer at least equal to two;

using a portion of the set of signals to estimate channels of the multi-carrier system; and decoding at least a portion of the set of signals by mapping them to a signal constellation, the signal constellation defining a plurality of C constellation points and n=2M real dimensions, wherein the C points are disposed about at least two mutually exclusive subsets such that a separation between two nearest constellation points of adjacent subsets is based on a maximized minimum difference between conditional probability distributions wherein mapping at least a portion of the set of signals to the signal constellation comprises determining a conditional probability distribution of each symbol within the at least a portion of the set of signals and wherein the conditional probability distribution is $$p(X_i \mid S_i, \hat{H}_i) = E_{\tilde{H}_i}\{p(X_i \mid S_i, \hat{H}_i, \tilde{H}_i)\}$$
$$= \frac{1}{\pi(\sigma^2 + \sigma_E^2 \|S_i\|^2)} \exp\left\{-\frac{\|X_i - S_i \hat{H}_i\|^2}{\sigma^2 + \sigma_E^2 \|S_i\|^2}\right\}$$

that is maximized over at least two possible values for $S_i$ for each symbol and wherein, $S_i$ comprises a transmitted signal vector, $\hat{H}_i$ comprises a channel estimate matrix, $X_i$ comprises a received signal vector, $\tilde{H}_i$ comprises an estimation error matrix at an $i^{th}$ frequency bin, $E_{\tilde{H}_i}$ is an error estimation matrix, and $\sigma_E$ is the estimation variance at each frequency bin.

* * * * *